(12) United States Patent
Mahapatra et al.

(10) Patent No.: US 7,766,561 B1
(45) Date of Patent: Aug. 3, 2010

(54) ENVIRONMENTALLY ROBUST LIQUID CRYSTAL POLYMER COATED OPTICAL FIBER CABLE AND ITS USE IN HERMETIC PACKAGING

(75) Inventors: Amaresh Mahapatra, Acton, MA (US); Robert J. Mansfield, Sterling, MA (US)

(73) Assignee: Linden Photonics, Inc., Westford, MA (US)

( * ) Notice: Subject to any disclaimer, the term of this patent is extended or adjusted under 35 U.S.C. 154(b) by 0 days.

(21) Appl. No.: 12/490,586

(22) Filed: Jun. 24, 2009

Related U.S. Application Data (62) Division of application No. 11/986,815, filed on Nov. 27, 2007, now Pat. No. 7,570,853.

(51) Int. Cl.
*G02B 6/36* (2006.01)

(52) U.S. Cl. .............................. 385/94; 385/88; 385/92; 385/128

(58) Field of Classification Search ................... 385/94, 385/100, 141, 14, 88, 89, 92, 93, 142, 145, 385/128, 11
See application file for complete search history.

(56) References Cited

U.S. PATENT DOCUMENTS

| | | | | |
|---|---|---|---|---|
| 4,778,244 A | * | 10/1988 | Ryan | 385/100 |
| 5,790,733 A | * | 8/1998 | Smith et al. | 385/88 |
| 5,940,562 A | * | 8/1999 | Henson et al. | 385/88 |
| 6,283,644 B1 | * | 9/2001 | Gilliland et al. | 385/93 |
| 6,320,257 B1 | * | 11/2001 | Jayaraj et al. | 257/723 |
| 7,570,853 B2 | * | 8/2009 | Mahapatra et al. | 385/102 |
| 2004/0240804 A1 | * | 12/2004 | Mahapatra et al. | 385/94 |
| 2008/0095507 A1 | * | 4/2008 | Mahapatra et al. | 385/102 |

\* cited by examiner

*Primary Examiner*—Brian M Healy
(74) *Attorney, Agent, or Firm*—Francis J. Caufield (57) ABSTRACT

The invention relates to high-strength, abrasion-resistant optical fiber cable having a supplemental layer consisting essentially of a liquid crystal polymer (LCP) to enhance the cable's tensile strength and hermetically seal it, and an outermost encasing layer to protect the LCP supplemental layer from damage that could otherwise diminish the tensile strength or destroy the moisture barrier properties of the cable gained by adding the supplemental liquid crystal polymer layer. The encasing layer is preferably a thin layer of a smooth, non-crystalline thermoplastic that can be easily removed with chemicals that do not affect the properties of the supplemental layer so that the supplemental layer can be made accessible for promoting the formation of hermetically sealed interfaces between the cable and other structures. Cross-head extrusion methods for coating optical fibers with LCP and encasing layers are described along with laser and ultrasonic bonding techniques for fabricating hermetic packages.

19 Claims, 9 Drawing Sheets

ENVIRONMENTALLY ROBUST LIQUID CRYSTAL POLYMER COATED OPTICAL FIBER CABLE AND ITS USE IN HERMETIC PACKAGING

CROSS REFERENCE TO RELATED APPLICATION application is divisional application claiming benefit from U.S. patent application Ser. No. 11/986,815 now U.S. Pat. No. 7,570,853, filed on Nov. 27, 2007 in the name of Amaresh Mahapatra, et al. and entitled "Environmentally Robust Liquid Crystal Polymer Coated Optical Fiber And Its Use In Hermetic Packaging", the entire contents of which are incorporated herein by reference.

FIELD OF THE INVENTION

This invention generally relates to fiber optical component packaging structured to provide a hermetically sealed and moisture resistant barrier that passes standard industry hermeticity and damp heat qualification tests. More particularly, it relates high-strength, abrasion resistant optical fiber cable that makes use of a supplemental layer of a liquid crystal polymer to enhance the tensile strength of the fiber cable, hermetically seal it, and promote the formation of hermetically sealed interfaces between such coated fiber and other structures and an encasing layer to preserve the cable properties provided by the LCP supplemental layer.

BACKGROUND OF THE INVENTION

Most electronic components, such as integrated circuits (ICs) for example, are sealed within plastic packages. The plastic material is simply molded directly over the IC and a metal lead frame to which it is attached. However, this type of packaging is not particularly well suited for use with MEMS devices, where there is generally a need for an open space within the package to accommodate motion of the mechanical device within. In addition, effective packaging for MEMS and other electro-optical devices often needs to be comprised of hermetically sealed housings to prevent the ingress of corrosive elements such as water vapor and oxygen, isolate internal components from shock and vibration, shield the component from potentially harmful radiation, and provide a means of conducting heat away from power dissipating components. In the case of electro-optic devices, the packaging must also provide a stable platform for the positioning and interconnection of optical components, such as laser diodes, modulators, input and output fibers, and the like.

One of the most important features of a hermetic package is its ability to withstand extended periods of "damp heat" and remain "dry" inside. A typical hermetic test for telecom packages measures the package's ability to withstand 2000 hours in an environment of 85° C. at 85% relative humidity and remain "dry" inside; dry being defined as less than 5000 ppm internal moisture at the end of the test. Materials conventionally used to achieve a hermetic seal are few: metal, glass, and ceramics. Packages sealed properly with these materials are considered truly hermetic. Common hermetic seal interfaces are metal-to-metal seals, made via welding, brazing, or soldering; glass-to-metal seals; ceramic-to-metal seals; and glass-to-glass seals.

An example of a typical hermetic fiberoptic component package is a Kovar box with a Kovar lid that is resistance welded in place via a seam sealer. Light passes in and out of the package via hermetic optical paths. Current methods of passing light through hermetic photonic packages can be categorized as freespace or fiber feedthroughs. Freespace employs hermetic windows having metallized edges that are soldered or brazed into the package wall, sometimes via an intermediate metal ferrule or subcell. A hermetic collimator lens assembly is soldered to a metal package. Telecommunication grade optical fiber typically has a polymer cladding made of UV curable acrylate or Teflon. Hermetic seals cannot be made to these claddings since their moisture barrier properties are inherently low. Hence, wherever optical fiber exits a hermetic package, the cladding layer must be stripped, and the bare silica fiber metallized. Afterwards, a hermetic seal is made to the metallization. Because bare silica fiber is fragile and often breaks, this process is inherently expensive. Hermetic fiber feedthroughs are made using metallized glass fibers that are soldered to the package, typically via a cylindrical sleeve or support that protrudes from the package wall. The ferrule can then be hermetically attached to the package wall, typically soldered.

Fiber feedthrough ferrules with glass frits feature fibers sealed into a metal sleeve via a glass-to-metal seal using a glass frit between the glass fiber and metal sleeve (in this case the fiber is not metallized but its polymer cladding must be stripped). The ferrule can then be soldered to the package wall, or it may be part of the package wall.

Thus, there is a continuing requirement in the industry for low-cost hermetic packages. Polymer packaging would be inherently low-cost; however, adhesives, epoxies, and polymers have not been shown to keep moisture out of packages in extended damp heat tests. Some polymer-based sealing methods and packages may satisfy limited test requirements, but moisture diffuses through these materials over time. Nonhermetic and quasi-hermetic packages are suitable for certain applications. The component end-customer usually determines test requirements.

Recently, a new class of polymers, Liquid Crystal Polymers (LCP), has been shown to have excellent moisture and oxygen barrier properties. Silicon Bandwidth, Inc., (Fremont, Calif.) and Foster Miller, Inc. (U.S. Pat. No. 6,320,257), have both proposed a liquid-crystal polymer package that can be metallized and soldered or welded to suitable lids to produce packages that may not be strictly hermetic but may pass the Telecordia "damp heat" qualification test. Even with an LCP package, the problems of producing an optical port remain; namely, stripping and metallizing the fiber and soldering to the metallization. A need, therefore, exists for an improved technique to implement an optical port to be incorporated into metal, ceramic or LCP packages, and it is a primary object of this invention to satisfy this need.

Additionally, it is known (See U.S. Pat. No. 4,778,244 to Ryan) to overcoat optical fiber with LCPs to provide an optical cable with enhanced strength which, in turn, may be over coated with scuff resistant coatings. However, the scuff resistant coatings described are difficult to remove to allow ready access to the LCP coating for other purposes.

It is another object of this invention to provide optical fiber cable with enhanced strength and easily removable encasing coatings to protect against environmental effects such as moisture and chafing forces.

It is yet another object of this invention to provide optical fiber structures having properties for promoting the formation of hermetic seals when combined with other structures.

It is still another object of the present invention to provide hermetically sealed packaging for optical and electro-optical components.

Yet another object of the present invention is to provide manufacturing processes for fabricating optical fibers coated with LCP and chemically removable encasing layers.

Still another object of the present invention is to provide manufacturing processes by which hermetically sealed devices can be fabricated with LCP materials and optical fibers having supplemental LCP and encasing layers to protect against environmental effects such as moisture and mechanical forces.

Other objects of the invention will, in part, appear hereinafter and will, in part, be obvious when the following detailed description is read in connection with the drawings.

SUMMARY OF THE INVENTION

The invention relates to high-strength, environmentally robust optical fiber cables having a supplemental layer consisting essentially of a liquid crystal polymer (LCP) to enhance the cable's tensile strength and hermetically seal it and an outermost encasing layer to protect the LCP supplemental layer from damage that could otherwise diminish the tensile strength and moisture resistant properties of the cable gained by adding the supplemental liquid crystal polymer layer. The encasing layer is preferably a thin layer of a smooth, non-crystalline thermoplastic that can be easily removed with chemicals that will not affect the properties of the LCP supplemental layer so that the supplemental layer can be made accessible for promoting the formation of hermetically sealed interfaces between the cable and other structures. Crosshead extrusion methods for coating optical fibers with LCP and chemically removable layers are described along with laser and ultrasonic bonding techniques for fabricating hermetic packages.

In one aspect, the invention comprises an optical fiber cable having a core with a given index of refraction. The core is surrounded with a cladding layer having an index of refraction lower than that of the core so that the two in combination are capable of propagating light along the length of the fiber cable. At least one other layer surrounds the cladding and comprises a liquid crystal polymer material to enhance the strength of the fiber cable, hermetically seal it, and promote the formation of hermetically sealed interfaces between the optical fiber cable and other structures. The core and cladding are preferably of pure fused silica with the core slightly doped with an index raising material. LCP coatings may also be applied to optical fiber cables having acrylate buffer layers over pure fused silica cladding and inner core. Surrounding the LCP supplemental layer is a thin chemically removable encasing coating to maintain the strength enhancing, moisture barrier, and interfacing benefits gained by the presence of the LCP layer, but is otherwise easily removable under field conditions via chemicals that do not destroy the properties of the LCP layer, especially its ability to form hermetic seals with other structures fabricated of LCP.

It is preferred to use a vertical drawing process with a crosshead extruder to apply the LCP and encasing layers over fibers formed of pure fused silica claddings and inner cores. Use of a horizontal crosshead extrusion process may be made for applying the LCP and encasing layers over fibers that already have exterior polymer buffers such as acrylate or the like.

Packaging systems for hermetically sealing opto-electronic components, while providing ports for exchanging signals with components outside of the system, are also provided. Such systems comprise a housing for holding at least one opto-electronic component in place within the housing and include means for providing a port for receiving and holding at least one optical fiber cable adapted to optically connect with an opto-electronic component to provide a conduit for exchanging signals with the opto-electronic component. The housing is composed of a material for at least in part hermetically sealing the opto-electronic component within it. An optical fiber cable having a liquid crystal polymer layer and an exterior chemically removable encasing layer is provided to enhance the strength of said optical fiber cable, hermetically seal it, and promote the formation of a final hermetic seal at the housing port where the LCP layer of said optical fiber cable, upon the selective local removal of the encasing layer, interfaces with the housing to complete the hermetic seal of the opto-electronic component within the housing.

Housings comprise substrate bases, shallow casings or gaskets, and caps that are provided with materials and features making them amenable to fabrication using laser bonding and ultrasonic welding to provide hermetic ports and seals.

BRIEF DESCRIPTION OF THE DRAWINGS

The structure, operation, and methodology of the invention, together with other objects and advantages thereof, may best be understood by reading the detailed description in connection with the drawings in which each part has an assigned a label and/or numeral that identifies it wherever it appears throughout the various drawings and wherein.

DETAILED DESCRIPTION

The invention relates to high-strength, abrasion-resistant optical fiber cable having a supplemental layer consisting essentially of a liquid crystal polymer (LCP) to enhance the cable's tensile strength, hermetically seal it, and provide interfacing and an outermost encasing layer to protect the supplemental layer from damage that could otherwise diminish the properties of the cable gained by adding the supplemental liquid crystal polymer layer. The encasing layer is preferably a thin layer of a smooth, non-crystalline thermoplastic that can be easily removed with chemicals that will not affect the properties of the supplemental layer so that the supplemental layer can be made accessible for promoting the formation of hermetically sealed interfaces between the cable and other structures. Methods for hermetically sealing packaging are also provided.

Figure 1:
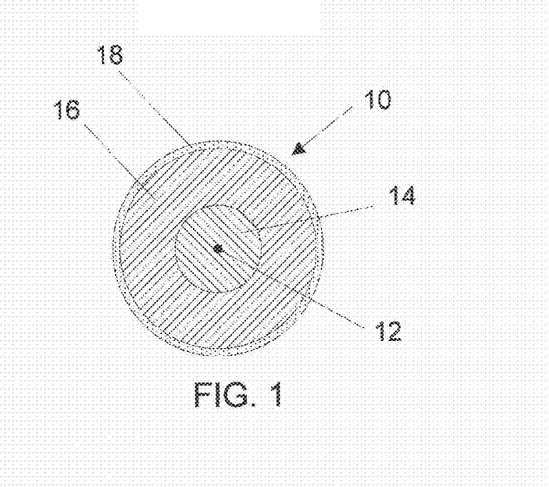
FIG. 1 is a diagrammatic cross-sectional view of the structure of an optical fiber cable in accordance with the invention.

Reference is now made to FIG. 1 which shows the cross-sectional shape of a high-strength, abrasion-resistant optical fiber cable 10 according to the invention. As seen, optical fiber cable 10 comprises a core 12, a cladding 14, a supplemental layer 16 composed of LCP, and a thin, chemically removable encasing layer 18. Core 12 and cladding 14 are preferably formed of pure fused silica ($SiO_2$), but may be beneficially composed of other suitable materials, as well. In addition, core 12 is slightly doped with an index raising material, such as Germania ($GeO_2$), so that its index of refraction is slightly higher than that of cladding 14. Core 12 and cladding 14 collectively operate by total internal reflection to confine radiation in core 12 as it propagates longitudinally along the fiber's length.

Generally, core 12 and cladding 14 are fabricated by drawing down a preform made from a well-known modified inside chemical vapor deposition process (MCVD) or OVD (outside vapor deposition) or VAD (vapor phase axial deposition). During the drawing process, LCP supplemental layer 16 is applied directly to the fiber by means of a vertically oriented extruder. The liquid crystal polymer layer 16 is applied to enhance the strength of optical fiber cable 10, hermetically seal it, and facilitate, in a manner to be described later, the formation of hermetically sealed interfaces between optical fiber cable 10 and other structures, as for example, hermetically sealed component packaged devices.

Extruded LCPs have high tensile strength, a measure of the force per unit cross-section at which an extruded tube of LCP will break. However, as we have discovered through extensive experiments, this does not mean that LCPs are safe from external environmental effects such as moisture and mechanical forces such as chafing forces applied over time. For example, abrasion from chafing forces is a form of damage that results when the surface of a material is rubbed against the surface of another material. In many potential applications, optical cables need to have high tensile strength so that they do not break as a result of the tension during deployment. They also may need to be abrasion resistant since deployment may involve pulling through a conduit where the cable surface will rub against the conduit walls and thus be exposed to chafing forces.

We have determined experimentally that extruded LCP layers on optical fiber do not possess sufficient resistance to environmental effects such as abrasion, and have developed an abrasion test method to determine abrasion resistance. A fine grit (120 grit) rubberized abrasive wheel is used for abrasion. A length of LCP coated optical cable is securely fastened to a rigid horizontal surface. The test section is continuously abraded, in a reciprocating manner for 100 cycles, by a 25 mm square section of the rubberized abrasive element. The load on the abrasive element during test is a minimum of 500 gm. Following the test, the sample is examined under a microscope to determine the extent of surface damage. The sample passes the test if the breaking strength after abrasion is no less than 90% of the breaking strength before abrasion. As a consequence of our testing, we have determined that it is necessary to provide an encasing layer 18 over the LCP supplemental layer 16 to preserve the strengthened properties and hermetic seal of optical fiber cable 10 which otherwise would be diminished considerably absent the encasing layer 18. Results have indicated that the enhanced strength made possible by the LCP layer can be reduced by abrasion by as much as 41.7%, an unacceptably high level.

We have found that resistance to environmental effects can be made acceptable by extruding a thin layer of a smooth, non-crystalline thermoplastic on top of the supplemental LCP layer. The polymer for this layer is chosen not for its tensile strength, but for its ability to produce a smooth, surface resistant to externally applied mechanical forces tending to abrade or otherwise mechanically damage the supplemental LCP layer.

In addition to the protective properties of layer 18, it must also be easily removable under anticipated conditions of use in the field so that it can be selectively removed to expose the underlying LCP layer so that the supplemental LCP layer can be interfaced (bonded) with other structures to provide hermetically sealed systems. To this end, the composition of the encasing layer 18 preferably is chemically removable by exposure to softening agents that permit small, but controllable, lengths to be wiped away without damaging or changing the underlying properties of the supplemental LCP layer 16.

Suitable compositions of the encasing layer 18 include polyamides such a Nylon 12 and polyesters. Nylon 12 may be rendered removable (strippable) by exposure to Chromic Acid (50%), Hydrochloric acid (37%), Nitric Acid (50%), or Sulphuric Acid (50%) while polyamides, in general, can be softened with dichloromethane, combined with trifluoroacetic anhydride, which reacts with the amide groups and leads to a rapid dissolution of polyamides at ambient temperature. Benzyl alcohol may also be used at 130° C. Warm benzyl alcohol presents few safety hazards. HFIP+potassium trifluoroacetate (mass fraction 0.2%). 1,1,1,3,3,3-Hexafluoropropan-2-ol (HFIP) is also a quasi-universal solvent for polyamides at ambient temperature.

Polyesters may be rendered strippable by exposure to Methylene Chloride, acetone, methanol, and ethanol.

The material composition of encasing layer 18 should also be extrudable, preferably in the form of a thermoplastic.

Figure 2:
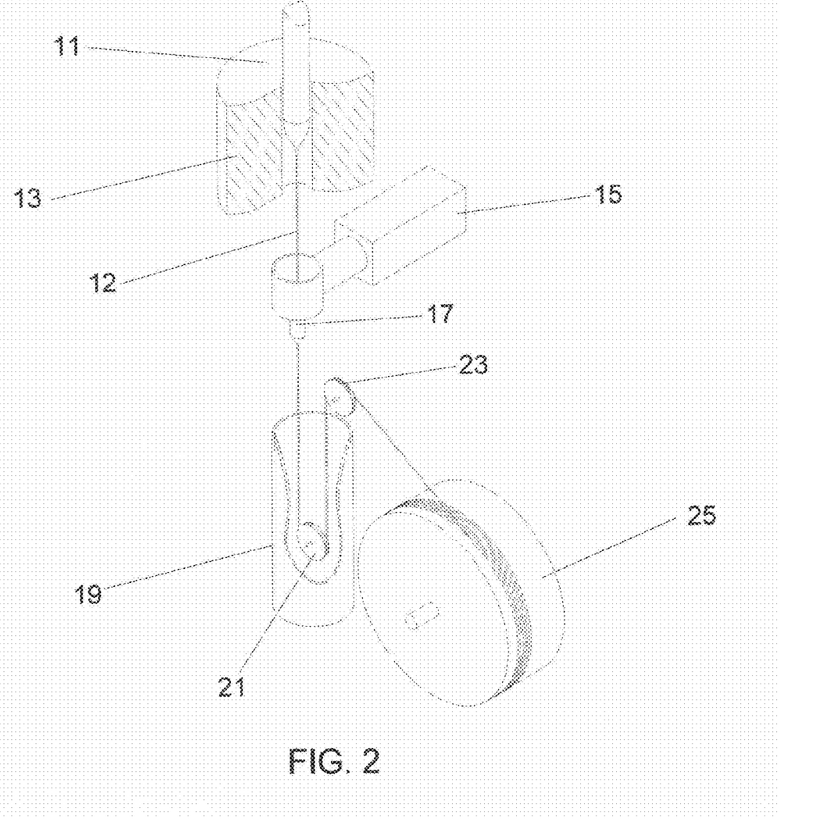
FIG. 2 is a diagrammatic perspective view of a vertically oriented drawing apparatus with a crosshead extruder for applying LCP and encasing layers over a fiber shortly after being drawn from a preform.

Reference is now made to FIG. 2 which shows apparatus by which optical fiber cable 10 is fabricated with supplemental LCP layer 16 and encasing layer 18, both applied serially to cladding 14 that, in turn, surrounds core 12. As seen in FIG. 2, supplemental LCP layer 16 is applied to cladding 14 during the fiber drawing process, as it is essential that the fiber (core 12 and cladding 14) be protected from environmental effects immediately upon being drawn.

A fiber perform 11, from which core 12 and cladding 14 is drawn, is fed vertically into the top of a high temperature furnace 13, where the tip of perform 11 is heated until it softens. A thin glass fiber consisting of core 12 and cladding 14 is then drawn from the bottom of perform 11 and fed through the remainder of the coating apparatus. To apply the supplemental LCP layer 16 to cladding 14, an extruder 15 feeds molten LCP polymer under pressure into a conical shaped tip 17 surrounding the fiber. The molten polymer thus forms a tight fitting sleeve around the fiber and is cooled and solidified by passing it through cold water contained in a cylindrical water trough 19. The water in trough 19 is circulated and cooled with fiber 10 passing through it over two pulley wheels, 21 and 23, respectively. Afterwards, the encasing layer 18 is applied with apparatus (not shown) similar to that used to apply LCP supplemental layer 16. Finished fiber cable 10 is finally wound onto a large diameter fiber take-up storage drum 25. This entire process may be under the supervision and control of a computer with appropriate software to schedule and monitor the apparatus, associated activities of the apparatus, and communicating instructions and data among the components of the apparatus.

Referring back to FIG. 1 again, core 12 is preferably single mode having a diameter in the range between 5 to 8 micrometers, the diameter of cladding 14 extends out to 125 micrometers, and the thickness of supplemental LCP layer 16 is 75 micrometers, and that of the encasing layer 18 is about 40 micrometers or less, making the final diameter of optical fiber cable 10 about 440 micrometers. Supplemental LCP layer 16 may be increased in thickness to increase the tensile strength of optical fiber 10.

Optical fibers are thin filaments of glass typically about 0.005" in diameter. As described above, they consist of a central core region surrounded by an optical cladding, the refractive index of which is slightly lower than that of the core. Light launched into one end of the fiber is guided, essentially without loss, via total internal reflection at the core-cladding interface. Optical fibers are inherently very strong. Indeed, fused silica of which many fibers are made is one of the strongest materials known, with a modulus of $10^7$ psi. During the high temperature draw process, the surface of the optical fiber is essentially flame polished making it very smooth and clean. As the fiber is drawn from a furnace, a primary buffer coating of a relatively soft elastomeric material is applied. In commercial optical fiber, the typical primary coating is UV cured acrylates, or Teflon. This coating serves to maintain the polished surface of the fiber and also to prevent the fiber from bending too sharply, which would cause stress and also lead to increased optical attenuation. Typically, the primary coating is about 60 μm thick, giving a final diameter of the primary coated fiber of about 250 μm.

To create a fiber cable, the optical fiber is further protected by additional layers of extruded polymer and in many cases, longitudinal strength members, made from materials such as Kevlar.

Apart from the advantages offered in terms of packaging, LCP coatings also present a means of creating very strong, compact and lightweight optical fiber cables. For these applications, optical fiber structures of the type shown in FIG. 4A may be used. Here, the optical fiber, designated at 50, has a slightly doped $SiO_2$ core 52 surrounded by an $SiO_2$ cladding 54, in turn, surrounded by an acrylate buffer 56. Surrounding the acrylate buffer 56 is a supplemental LCP layer 58, again 75 or more micrometers in thickness. Beyond the supplemental LCP layer 58 is an encasing layer 60, such as that previously described as layer 18 in FIG. 1. Thus, the use of LCP as a supplemental layer or coating on top of a conventional primary buffer or coating of commercial optical fiber is shown. Such cables have applications in precision guided munitions, such as TOW missiles and "wire" guided torpedoes, local area optical communications (plenum cables), and optical fiber sensors. There appear to be no other materials that can be extruded onto optical fibers that would provide the mechanical strength, thermal stability, and moisture barrier properties of LCPs.

Figure 4A:
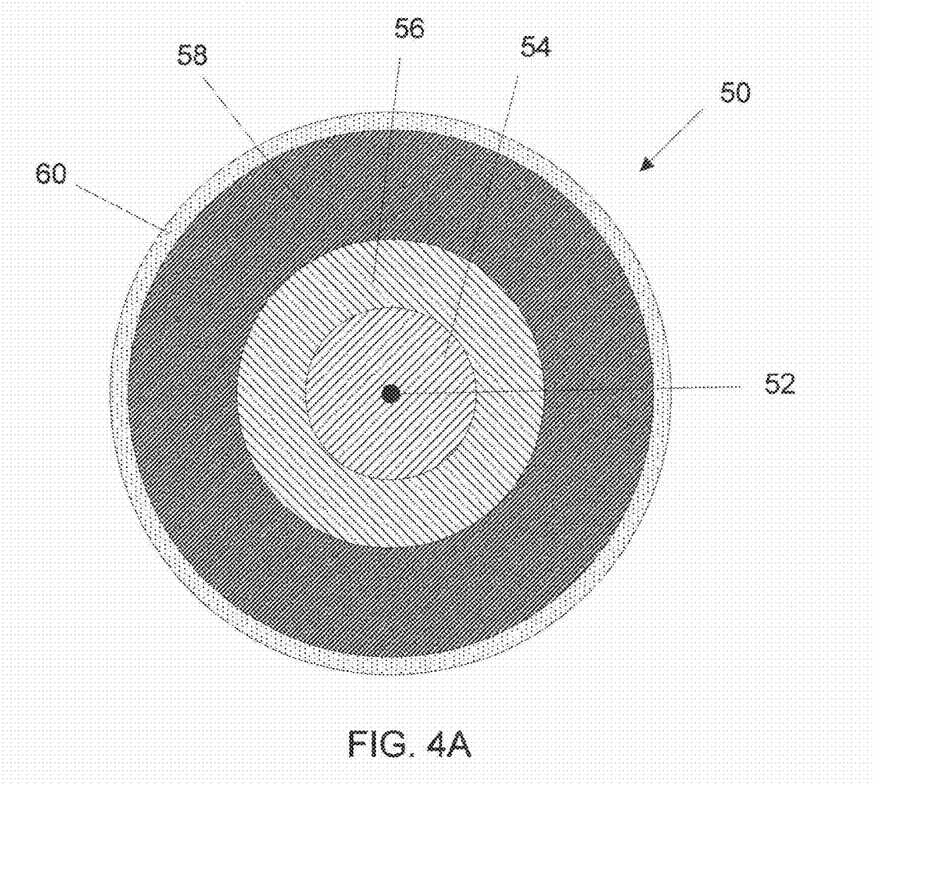
FIG. 4A is a diagrammatic cross-sectional view of the structure of another optical fiber cable in accordance with the invention.
Figure 4B:
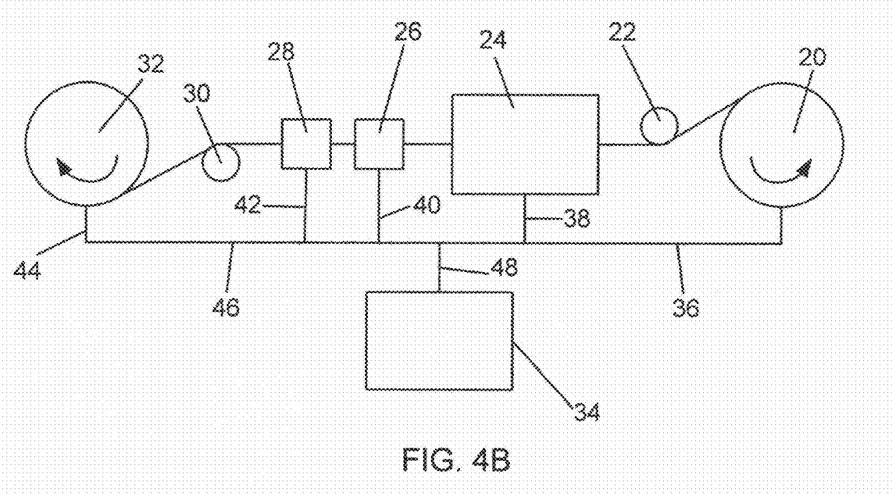
FIG. 4B is a flow chart of a process for applying the outer layers on the optical fiber cable shown in FIG. 1

Reference is now made to FIGS. 4A and 4B, which show a method for applying supplemental LCP layer 58 and encasing layer 60. After the basic structure comprising core 52 and cladding 54 and a primary buffer coating 56 consisting typically of acrylate is formed, it is stored on a feed spool 20 that is mounted for rotation around a journal. Uncoated fiber leaves feed spool 20 and is guided by a positioning idler 22 to a well-known crosshead extruder 24 that is used to raise LCP material above its melt temperature and deposit it as a layer on buffer coating 56.

Figure 3:
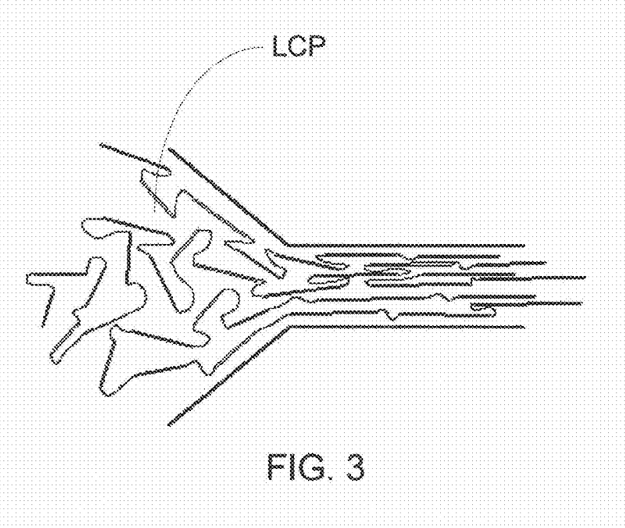
FIG. 3 is a diagrammatic illustration showing how LCP material becomes aligned as it passes through an extrusion head during coating.

FIG. 3 illustrates in a general way how LCP material is organized and oriented as it passes thorough crosshead extruder 24, as will be explained in more detail hereinafter. Afterwards, about 10 cm downstream of crosshead extruder 24, the LCP coated fiber is sent through a water bath 26 to solidify the supplemental LCP layer 58. Care must be taken to make the water bath free of turbulence to reduce the possibility of forming a wavy exterior surface on supplemental LCP layer 58. After solidifying, the diameter of supplemental LCP layer 58 is measured at test station 28 for conformity with its intended design specification. Then, another idler 30 guides the finished fiber structure onto a take-up spool 32 or alternatively, extruder 24, cooling bath 26 and test station 28 are repeated in serial fashion to apply encasing layer 60. Throughout the coating process, take-up spool 32 places the fiber under tension to remove it from feed spool 20 and draw it through all of the other process stations prior to being rolled up for storage and subsequent use. Process control of all of the parameters of the various components and materials used in the coating process are under the control of a process controller 34, or suitably programmed computer, that passes signals and data among the various components via network connectors 36-48, or the like. General housekeeping chores are also under the control of process controller 34.

Having described fiber structures employing supplemental LCP and easily removable encasing layers and their method of fabrication, LCP materials themselves will now be discussed, particularly their barrier properties.

Not only are LCPs highly impervious to moisture, but also, as a result of their tightly packed crystalline nature, their interstices allow very little absorption of moisture or other gasses. Consequently, out-gassing, which is a problem for many polymers, is reduced to insignificant levels. Further, since LCP is merely heated to become fluid, there is no need to use solvated LCP, which eliminates another major source of outgassing. The moisture absorption and transmission properties of LCPs are compared with other polymer classes in Table 1 below.

TABLE 1

Comparison of barrier properties of different polymer classes

| Polymer class | Specific polymer | Moisture absorption (% @ 73° F., 50% relative humidity, per day | Moisture transmission rate (gm/m²/day/atm./mil) |
|---|---|---|---|
| Polyester | PET (poly ethylene terephthalate) | 0.06 (immersion) | 28 |
| Fluorinated polymer | PVDF (Polyvinylidene fluoride, Dupont TTR10AH9) | 0.5 | 5.3 |
| Polyamide | Nylon | 1.2 | |
| Liquid crystal polymer | Vectran 200P (made by Tecona) | 0.02 | 0.17 |
| | Zenite (made by Dupont) | 0.002 0.05 (6 mth. Immersion) | |

From the table, it can clearly be seen that LCPs offer very significant improvement both in terms of moisture absorption and transmission.

Table 2 below shows typical film properties of LCP versus polyethylene terephthalate (PET) films (Lusignea, R. W., 1997, "Liquid Crystal Polymers: New Barrier Materials for Packaging," Packaging Technology, October, 1997.). The water transmission rate through a 25 μm LCP film is 0.17 gm/m²/day for an ambient pressure of 1 atmosphere.

A typical electronic package including cap and housing may be 10 mm×10 mm×2 mm. Assuming the whole package is made of LCP, the total surface area is 280 mm². The total amount of moisture that would penetrate such a package in a year, M, is given by:

$$M = \frac{0.17 \; gm}{m^2 \cdot \text{day}} \times 365 \; \text{days} \times 280 \times 10^{-6} m^2 \approx 0.017 \; gm.$$

If the wall thickness of the housing and cap is 1 mm instead of 25 μM, the moisture level in the cavity after 1 year drops to insignificant levels.

TABLE 2

Typical LCP film properties

| | Biaxially-oriented PET film | LCP Film |
|---|---|---|
| Tensile strength (kPa) | 172,000 | 240,000 |
| Tensile modulus (106 kPa) | 5.2 | 12.4 |
| Oxygen permeability (cc/m²-24 hr.-atm.) | 78 @ 25 μm | 0.23 @ 25 μm |
| Water vapor transmission rate (gm/m²-24 hr.-atm.) (per ASTM F-1249) | 28 @ 25 μm | 0.17 @ 25 μm |
| Upper use temp. (° C.) | 120 | Over 200 |
| Density (gm/cc) | 1.4 | 1.4 |
| Tear resistance, Initiation, kN/m | 35 | 595 |
| Tear resistance, Propagation, kN/m | 9 to 53 | 175 to 525 |

From Table 2, the oxygen transmission rate through a 25 μm LCP film is 0.23 cc/m²-24 hr.-atm. The total amount of oxygen that would penetrate such a package in a year, ( ), is given by:

$$O = \frac{0.23 \; cc}{m^2 \cdot \text{day}} \times 365 \; \text{days} \times 280 \times 10^{-6} m^2 \approx 0.02 \; cc$$

Given the volume of the cavity, this translates into a partial pressure of 0.1 atmospheres, which would also become negligible if the wall thickness of the housing and cap is 1 mm instead of 25 μm.

Therefore, the moisture and oxygen barrier properties of LCP are more than adequate. Coupled with the moisture and oxygen barrier properties of LCP, the invention provides reliable and simple bonding techniques for providing hermetically sealed packaging arrangements as will be described in more detail hereinafter.

Having described the barrier properties of LCPs, it is also important to understand their thermal, mechanical and electrical properties.

LCPs are thermoplastic so that there is an intermediate temperature such that the LCP is made fluid without a break down of the crystal structure. They typically melt at about 280° C. and are thermally stable to 350° C. The coefficient of thermal expansion (CTE) is very low, and highly anisotropic, being lowest in the direction of molecular alignment. The actual bulk value of the CTE can therefore be controlled to some extent by either controlling the degree of orientation, or by laminating layers with orthogonal orientations (See U.S. Pat. No. 5,529,741 incorporated herein by reference). This is a desirable feature, since it means that the CTE can be matched to that of the substrate material, thus significantly reducing stress associated with thermal cycling.

LCPs also exhibit very little creep. This means that microscopic features produced by molding, embossing or other such processes will retain their sharp edges and dimensional stability. Complex packaging designs, as those to be described, are therefore possible, in which finely detailed features can be defined to locate, align and secure the various optical and opto-electronic components.

In the electronic industry, the use of polymers with high temperature stability is not new. For instance polyimide, which is stable to 350° C., has been used for fabrication of flexible circuits in electronic assemblies. But, it has a tendency to absorb moisture, which interferes with high frequency performance. It has been found recently that liquid crystal polymers (LCP) have significantly lower moisture absorption, and transmission while being stable up to 350° C. and can, therefore, be used in high frequency flexible circuits.

LCPs have a low dielectric constant and loss factor from 1 kHz to 45 GHz. For instance copper clad Biac LCP, sold by W. L. Gore for flex circuit applications, has a dielectric constant of 3.0 and a loss tangent of 0.003 from 3 to 45 GHz.

The beneficial properties of LCPs make their use as optical fiber supplemental layers attractive for a variety of reasons. Liquid Crystal Polymers (LCPs) are aromatic polyesters with rigid rod like molecular structures. When heated and extruded, these long crystalline segments tend to align themselves in the direction of flow, much like logs in a river, see illustration in FIG. 3. However, extruded LCPs form long polymer chains that are principally aligned along the direction of extrusion as shown in FIG. 3. Such structures are built of individual, but parallel, interlacing strands of, polymer. Each strand has very high tensile strength. When a tensile force is applied to the structure, it exhibits high strength since the intertwined strands do not break easily and do not slip past each other. Rubbing of the structure surface against another surface, over time, however progressively tears the individual strands apart. Where this has happened, the structure loses tensile strength and moisture resistance since, in these sections, the several strands are no longer interlaced but become broken. To prevent degradation of tensile and moisture barrier properties over time and exposure to environmental forces, the extruded LCP needs to be encased by another material which is largely amorphous so that there are no individual strands that can separate one from the other, hence the need for the encasing layer previously described.

It is the high rigidity of these long crystalline segments that give the LCP materials their high modulus and low permeability. As indicated earlier, this invention advocates the use of Liquid Crystal Polymers as a supplemental layer or coating of optical fibers. LCP materials that have been found useful for the purposes of the invention comprise, for example, certain grades of the Vectra® LCP line marketed by Ticona, Summit, N.J. 07901 (See http://www.ticona.com). Vectra® liquid crystal polymers (LCP) are highly crystalline, thermotropic (melt-orienting) thermoplastics that deliver exceptionally precise and stable dimensions, high temperature performance and chemical resistance in very thin-walled applications.

The Vectra series of LCPs are primarily HNA-HBA copolymers where the fraction of HNA and HBA can be modified to alter LCP properties (see, for example, p. 375, "An Introduction to Polymer Physics," David I. Bower, Cambridge University Press 2002). HNA and HBA are acronyms for hydrobenzoic acid and hydroxynaphthoic acid, respectively.

The use of LCP as an accessible coating material in an optical fiber cable significantly reduces the problems associated with creating hermetically sealed optical ports in packaged electro-optical components. It has been demonstrated that, under the correct conditions of temperature, time, and pressure, a hermetic bond can be created between glass and LCPs, and it has been found that the temperature of the substrate to which the LCP material is to be bonded should be higher than the melt temperature of the LCP material and be applied under a slight positive pressure. The use of optical fiber cable having a supplemental LCP layer made accessible by removing an encasing coating is illustrated in FIG. 5 in the packaging of an electro-optic device.

Figure 5:
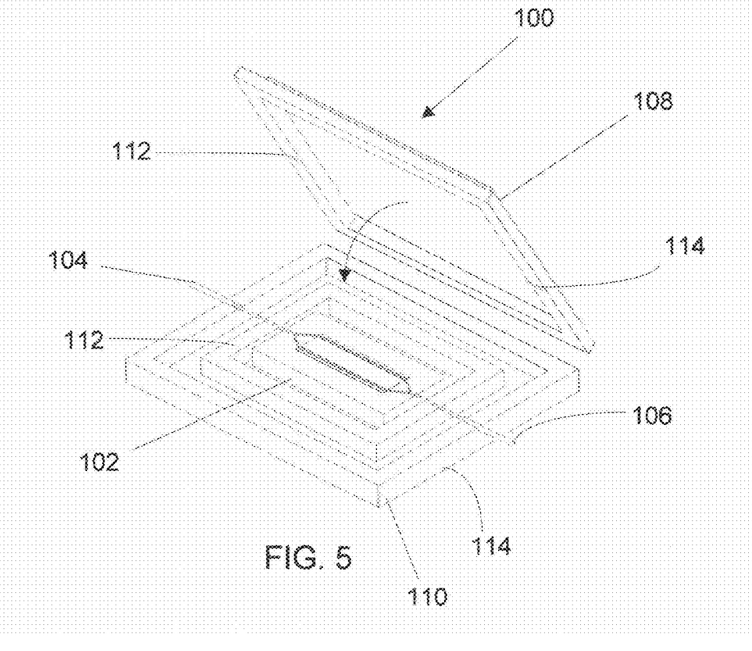
FIG. 5 is an exploded diagrammatic perspective view of components used to hermetically seal a device in accordance with the invention.

Referring now to FIG. 5, there is shown an electro-optic modulator 102 packaged according to the invention, although the principals of the invention apply to any such device. The packaging for electro-optic modulator 102 is indicated generally at 100 and consists of molded LCP parts, which have features for locating and securing input and output optical fiber cables, 104 and 106, respectively. The two halves of the package, LCP cap 108 and gasket 110, are brought together to capture the input and output fibers, 104 and 106, in small molded, generally elongated semicircular, recesses, 112 and 114, respectively, provided in the adjoining faces of LCP cap 108 and gasket 110. It will be understood that the encasing layer of the optical fiber cable will have been removed over an appropriate length to permit its underlying supplemental LCP layer to reside in recesses, 112 and 114. The two halves of package 100 are then fused together by heating. A scanning laser beam, ultrasonic or RF induction heating, or other functionally similar technique may perform the heating. In the case of laser bonding, the LCP materials need to be sufficiently thin to allow the laser radiation to reach joint areas or the overlapping seal areas can be melted to fuse the LCP materials to form seals, and this can be done scanning from the side where an interface exists or perpendicular to the joint as, for example, from the cap side.

Because the fiber cable supplemental layer or coating is made from the same material as the other packaging components (LCP), a perfect seal is created when the two materials are fused together. The package is hermetic since the LCP material has excellent moisture and oxygen barrier properties. Materials for the package can be selected from those already identified above.

With respect to the use of laser bonding, it was first demonstrated on thermoplastics in the 1970's, but has only recently found a place in industrial scale situations. The technique, suitable for joining both sheet film and molded thermoplastics, uses a laser beam to melt plastic in a joint region. The laser generates an intense beam of radiation, which is focused onto the material to be joined. This excites a resonant frequency in the molecule, resulting in heating of the surrounding material. Three forms of conventional laser bonding exist; CO2, Nd:YAG, and diode laser bonding. Table 3 below gives comparative data on laser bonding with CO2, Nd:YAG and diode lasers.

TABLE 3

Comparison of commercially available laser sources for plastics processing

| Laser Type → | CO2 | Nd:YAG | Diode |
|---|---|---|---|
| Wavelength (μm) → | 10.6 | 1.06 | 0.8-1.0 |
| Max. power (W) | 60,000 | 6,000 | 6,000 |
| Efficiency | 10% | 3% | 30% |
| Beam Transmission | Reflection off mirrors | Fiber optic and mirrors | Fiber optic and mirrors |
| Minimum spot size * (mm) | 0.2-0.7 diam. | 0.1-0.5 diam. | 0.5 × 0.5 |

Laser radiation is absorbed by polymers in molecular vibration spectra of covalent bonds such as C—H, C—C, C—O, C=O. The vibration spectra of a particular type of bond are characteristic of that bond. The location of these vibrational states is determined largely by the spring constant of the bond and the reduced mass of the two nuclei. Since the vibrational energy is inversely related to the reduced mass, bonds with low reduced mass (such as C—H) have high vibrational frequencies. For example, the C—H, —C=C—, and —C—O— bonds have fundamental vibrational resonance at wavelengths of 2, 3.3 and 10 μm, respectively. Since C—H is the bond with the lowest reduced mass in polymers, absorption below 2 μm is minimal. In practice, because of vibrational overtones, most polymers are transmissive below 1 μm and highly absorptive above about 1.5 μm. $CO_2$ radiation (10.6 μm) is readily absorbed by most polymers in less than a mm. Nd:YAG (1.06 μm) will penetrate several mm into most polymers while diode lasers (0.8 μm nominal) will not be absorbed by polymers unless IR absorbing dyes such as carbon particles are added. Since there is some risk in degrading the barrier properties of LCP or generating carbonization by adding dyes or carbon powder, diode laser bonding is not an option.

Figure 6:
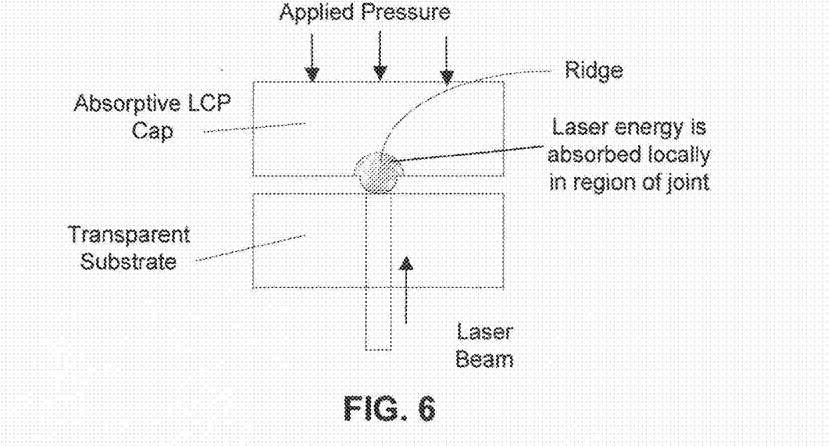
FIG. 6 is a diagrammatic elevational view illustrating an arrangement optionally employing a small ridge molded into an LCP cap to further increase the localized pressure in forming a joint between an LCP cap and a transparent substrate.

For electronic and opto-electronic packaging, an embodiment of the invention uses a laser as a means to bond an LCP cap to a substrate such as silica, silicon or ceramic (See FIG. 5). The ideal laser wavelength must be transmitted by the substrate and strongly absorbed by the LCP, in a thickness of a fraction of a millimeter. This allows laser delivery through the substrate to the junction that needs to be bonded. Mechanical pressure is applied to the bond region to ensure a viable bond. The LCP is sufficiently thick, e.g. 1 mm, so that only the interface layer melts, and thus, allows pressure to be applied to the unmelted layer of the LCP. To further increase the localized pressure, a small ridge may optionally be molded into the LCP cap, as shown in FIG. 6. The laser energy is absorbed within the raised ridge, causing it to melt and bond with the substrate.

Figure 7:
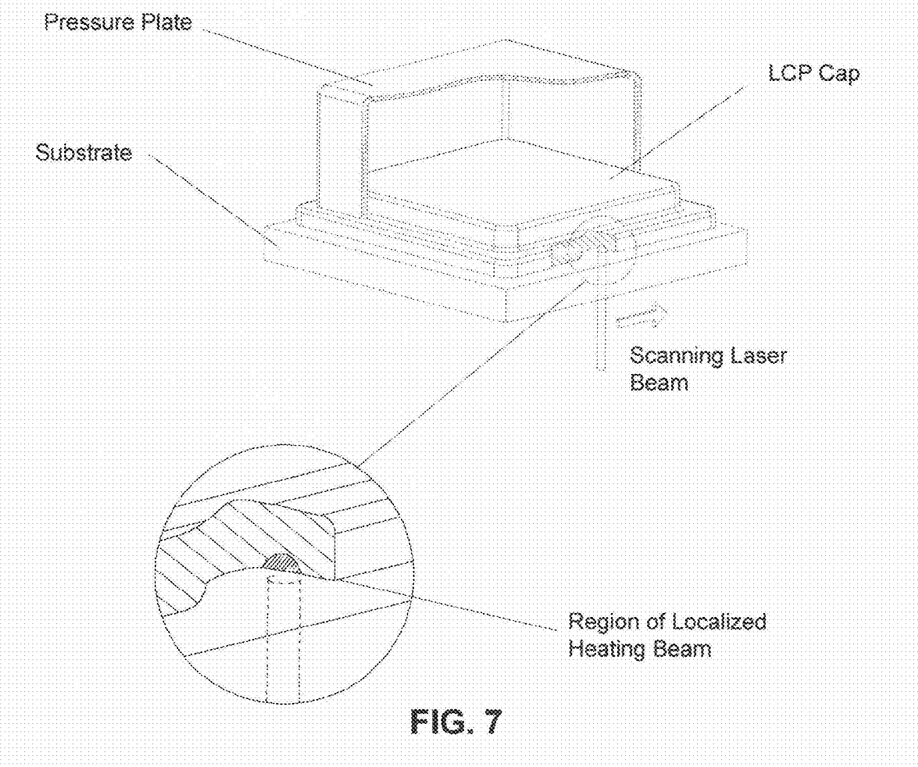
FIG. 7 is a diagrammatic perspective view of a hermetically sealed packaging arrangement with an LCP cap and substrate along with a cut away pressure plate and a scanning laser beam used for bonding purposes to form hermetic seals.
Figure 8A:
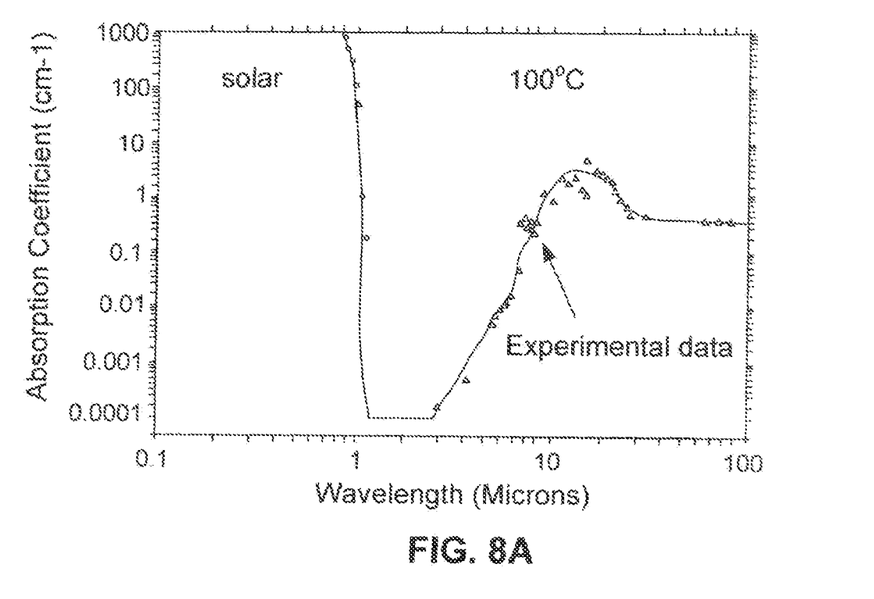
FIG. 8A is a graph of the absorption spectra of silicon illustrating that it is essentially transmissive to radiation with wavelength above about 1 $\mu m$.
Figure 8B:
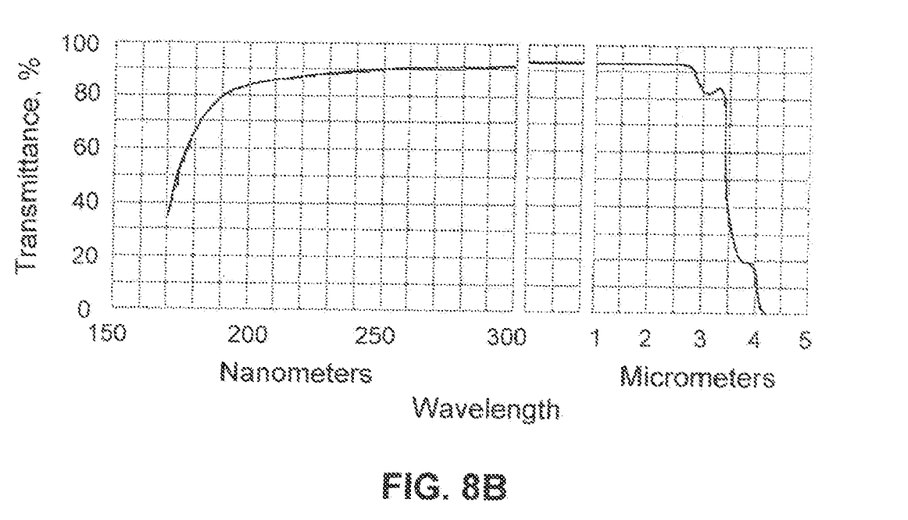
FIG. 8B is a graph of the transmission of silica showing that it is transmissive to radiation in the wavelength range from 0.2 $\mu m$ to 4 $\mu m$.

To bond an LCP cap to a substrate, the LCP ridge needs to be melted at all points. A scanning laser beam is employed (See FIG. 7) to accomplish this. The laser wavelength must be such that it is absorbed strongly by polymers—hence it must be >1.5 µm. Thus, Nd:YAG is not an option. It must also be transmitted by silicon, silica and ideally by ceramics such as sapphire. FIG. 7A shows that silicon is essentially transmissive above about 1 µm. Silica, on the other hand, is transmissive in the wavelength range from 0.2 µm to 4 µm as shown in FIG. 7B. Alumina (sapphire) is transmissive from 0.15 µm to 6.5 µm. Hence, an ideal wavelength for LCP bonding to all these substrates is in the range from 1.5 µm to 4 µm.

An embodiment of the invention uses a thulium fiber laser (wavelength: 1.8-2 µm) or Er:YAG laser (wavelength: 2.94 µm) for laser bonding LCP to silicon, silica and sapphire. IPG Photonics in Oxford, Mass., has developed thulium fiber lasers, which operate in the wavelength range of 1.8 to 2.0 µm range with a maximum output power of 100 W. These are CW lasers. CW lasers are typically better than pulsed lasers for polymer bonding since high peak power of pulsed lasers may result in local burning from impurities. Fiber lasers are ideally suited for beam delivery in a laser bonding application. Erbium in YAG (Er:YAG) lasers which operate at a wavelength of 2.94 µm and 30 W power have been developed primarily for dermatology applications. They are manufactured by companies such as Lynton Lasers in England and Unitech Corp in Japan. The wavelength is ideal for laser bonding LCP to silicon, silica or sapphire. Note that Er:YAG is not to be confused with Er in silica lasers and optical amplifiers (EDFA), which nominally operate at a wavelength of 1.5 µm.

Having discussed the structure and fabrication of optical fiber cables having supplemental LCP and removable encasing layers and their incorporation into a general form of hermetic package using laser and/or ultrasonic bonding, more detailed embodiments of packaging will now be discussed.

As indicated previously, the primary functions of packaging are:

To prevent the ingress of corrosive elements such as water vapor and oxygen.

To isolate the internal components from shock and vibration.

To shield the component from potentially harmful radiation.

To provide a means of conducting heat away from power dissipating components, and In the case of electro-optic devices, the packaging must also provide a stable platform for the positioning and interconnection of optical components, such as laser diodes, modulators, input and output fibers, and the like.

Figure 9A:
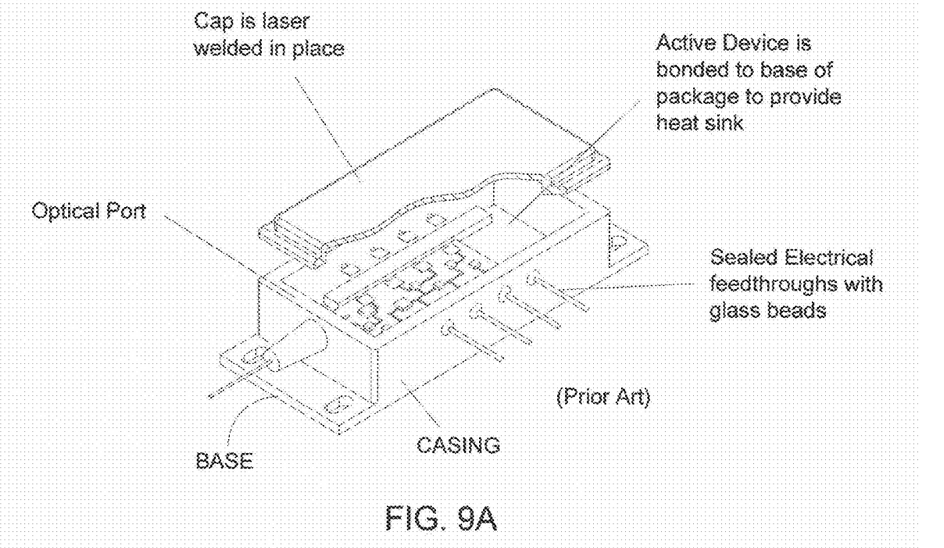
FIG. 9A is an exploded diagrammatic perspective view, with parts broken away, of a well-known hermetically packaged electro-optical device.

A typical, well-known, packaged electro-optic device is illustrated in FIG. 9A. This type of configuration, referred to as a Butterfly package, is used extensively in the packaging of electronic, electro-optic and micro electro mechanical systems (MEMS). The casing of the package is metal, and serves as both a barrier and a heat sink for the device, which is bonded to the base. Electrical connections to the device are made via electrical feedthroughs, which are sealed using glass beads, which are bonded to both the casing and the electrical conductors. Such glass-to-metal seals are used extensively in many types of packaging.

For an electro-optic device, such as the one illustrated, it is necessary to couple optical signals in and out of the device via optical cables. Creating a hermetically sealed optical port is a non trivial task, and typically involves metallizing the optical fiber cable so that it can soldered into a metallized glass bead which in turn is soldered into a small hole in the metal casing. To metallize the fiber, the protective outer buffer coating must first be removed, rendering the fiber very susceptible to moisture degradation and breakage. Creating the sealed optical port is therefore a very delicate, time consuming and expensive operation, and is one of the major factors contributing to the very high cost of packaging this type of component.

In accordance with a further aspect of the invention, the metal housing, glass beads and metalized fibers are replaced with a simplified, precision molded package, in which the necessary integrity is achieved by bonding the LCP directly to various components. In the case of the optical port, use is made of the LCP coated optical fiber cable as previously described, which can be thermally bonded directly into a housing after having had its encasing layer removed.

Figure 9B:
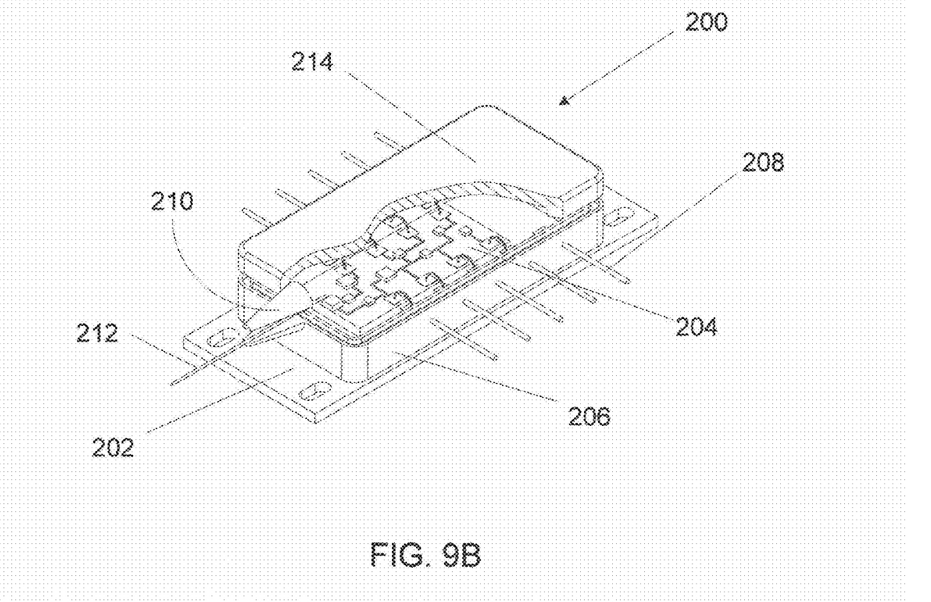
FIG. 9B is an exploded diagrammatic perspective view, with parts broken away, of an LCP packaged device in accordance with the invention.

Referring to FIG. 9B, there is shown an inventive package designated generally at 200 comprising a metal substrate 202 to which an actual device 204 is bonded. Substrate 202 serves primarily as a thermal heat sink for device 204. For devices with low power dissipation, the metal substrate is alternatively replaced by LCP.

An LCP gasket 206 or shallow casing is bonded to the metal substrate 202, with electrical feedthroughs 208 (typical) molded in. One or more optical ports are made using an LCP ferrule 210 that is molded to the outside of an LCP supplemented fiber 212. The ferrule 210 is designed so that it can be bonded to the LCP gasket 206 using ultrasonic bonding techniques to be described later. Finally an LCP cap 214 is bonded on to the top of the gasket 206, which may be accomplished using ultrasonic bonding.

A method of the invention for assembling an LCP housing can be summarized in five major steps:

Bonding an LCP gasket or shallow casing to a metal substrate or alternatively LCP substrate.

Producing hermetically sealed electrical feedthroughs.

Manufacturing supplemental LCP coated optical fiber cable with removable encasing layers.

Producing hermetically sealed optical feedthroughs.

Ultrasonically welding and bonding the LCP cap to the LCP gasket.

Figure 10:
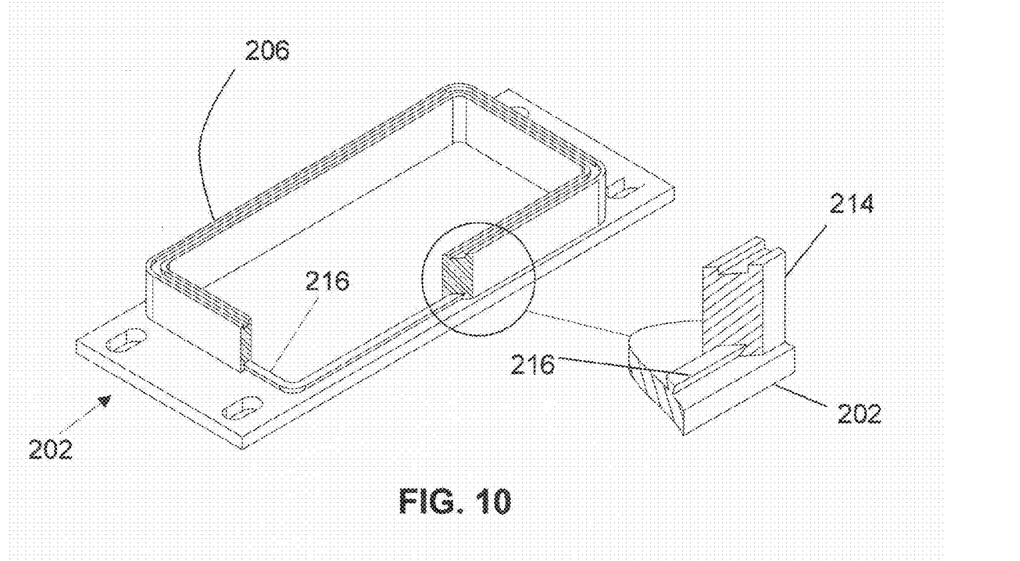
FIG. 10 is a diagrammatic perspective view, with parts broken away, of a substrate machined with a small dovetail shaped lip over which LCP is molded, along with an enlarged view of a the detail of the dovetail.

The first step in the packing process or method is to attach an LCP gasket to a metal or LCP substrate. LCP films are routinely bonded to thin copper laminates to produce flexible circuit boards, and the strength of the bond between the LCP and the copper is extremely high. However, in this particular situation, both materials are very thin, and stresses due to thermal expansion mismatch are relatively low. When more rigid and substantial components are connected together, the problem of thermally induced stresses becomes more significant, and it is probable that repeated thermal cycling could result in a failure of the LCP/metal bond. For this reason, the LCP gasket 206 is preferably attached to the metal substrate 202 by "over-molding" using a mechanical keying feature machined into the substrate 202. Over molding is a process whereby a polymer material is injection molded in a cavity into which the mating part (in this case, the substrate) has been placed. Here, the substrate is machined to produce a small dovetail shaped lip 216, over which the LCP is molded, as shown in detail in FIG. 10. The shape of the lip 216 ensures that, as the two materials expand and contract, the seal between them remains tight.

As with the gasket to substrate seal, a major problem to overcome with the electrical feedthroughs is that of preventing bond failure as a result of stresses resulting from mismatched expansion coefficients. As with the LCP to substrate seal, this problem is overcome by molding the LCP directly over the electrical output pins, and designing mechanical features into the latter, such that the two components are essentially locked together.

Figure 11:
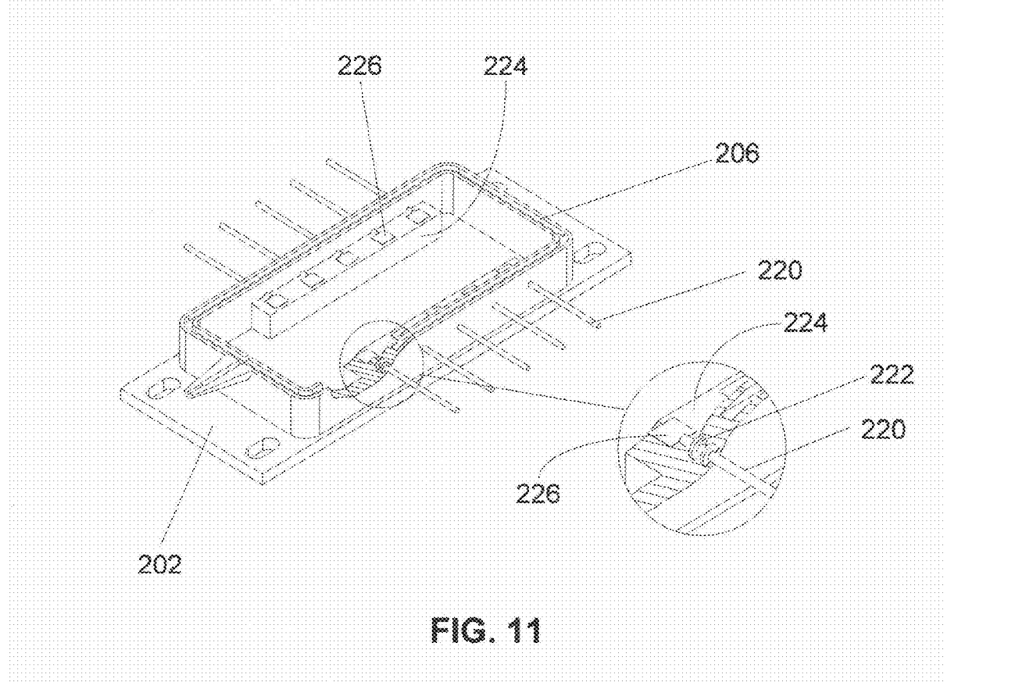
FIG. 11 is a diagrammatic perspective view along with a detailed enlargement for a design for over molding electrical feedthroughs in LCP packaging in accordance with the invention.

An embodiment of the over-molded electrical feedthroughs is shown in FIG. 11. Electrical pins 220 are manufactured either by machining or stamping, and are mounted onto a lead frame for insertion into the injection molding cavity. Ridges 222 (typical) are preferably provided on the metal conductors to further ensure a high integrity seal. Pedestals or ledge 224 are located underneath electrode pads 226 for location and support purposes.

Another aspect of the invention comprises extensive ultrasonic welding to bond various components together. Ultrasonic bonding is a technique widely used in the manufacture of plastic components. The materials to be welded must be thermoplastic. That is, they must not change their chemical composition upon melting. The process relies upon the use of high frequency sound waves to create localized heating by friction. The heating softens the thermoplastic material and causes the two parts to be fused together. In the bonding process, the two parts to be welded are held together under pressure and are then subjected to ultrasonic vibrations usually at a frequency of 10 to 40 kHz.

Figure 13:
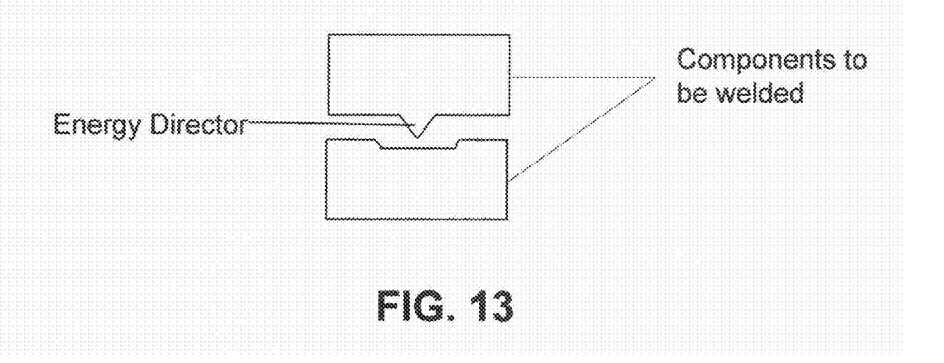
FIG. 13 is a diagrammatic elevational view showing specially configured components to be ultrasonically welded in an LCP arrangement using energy directors in accordance with another aspect of the invention.

The ability to weld a component successfully is governed by the design of the equipment, the mechanical properties of the material to be welded and the design of the components. In order to ensure that heat is generated locally, at the joint between the two parts, the components are designed with small features called energy directors (See FIG. 13). These energy directors consist of small (typically 0.1") ridges with pointed tops, which serve to focus ultrasonic energy into a relatively small volume of material, causing rapid heating and subsequent melting.

Figure 12:
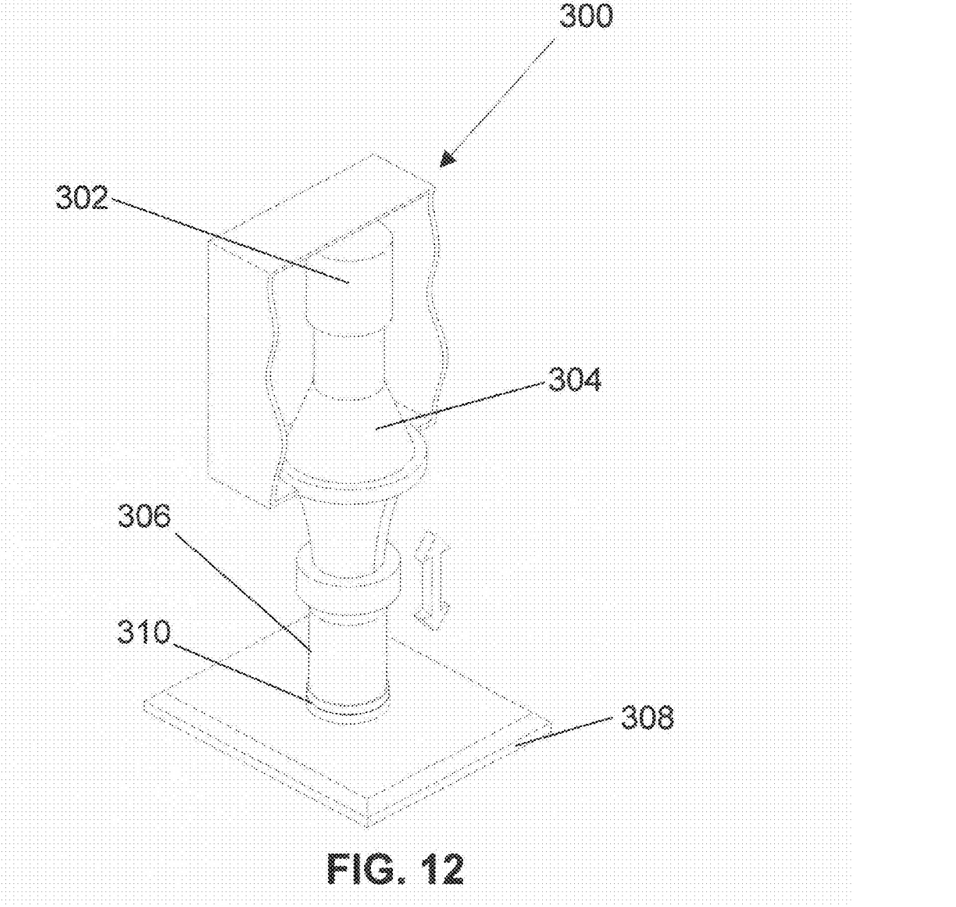
FIG. 12 is a diagrammatic perspective view, with parts broken away, showing an ultrasonic horn welding the components of an LCP package in accordance with another aspect of the invention.

A typical ultrasonic bonding system is illustrated generally at 300 in FIG. 12. It consists of a transducer 302, booster 304, horn 306 (or sonotrode) and anvil 308. The two parts to be welded are sandwiched between the horn 306 and the anvil 308, which must be relatively immoveable. Ultrasonic energy from the transducer 302 is amplified by the booster 304 and coupled to the horn 306, which in turn transmits it to the upper of the two components (Shown generally at 310).

Figure 14:
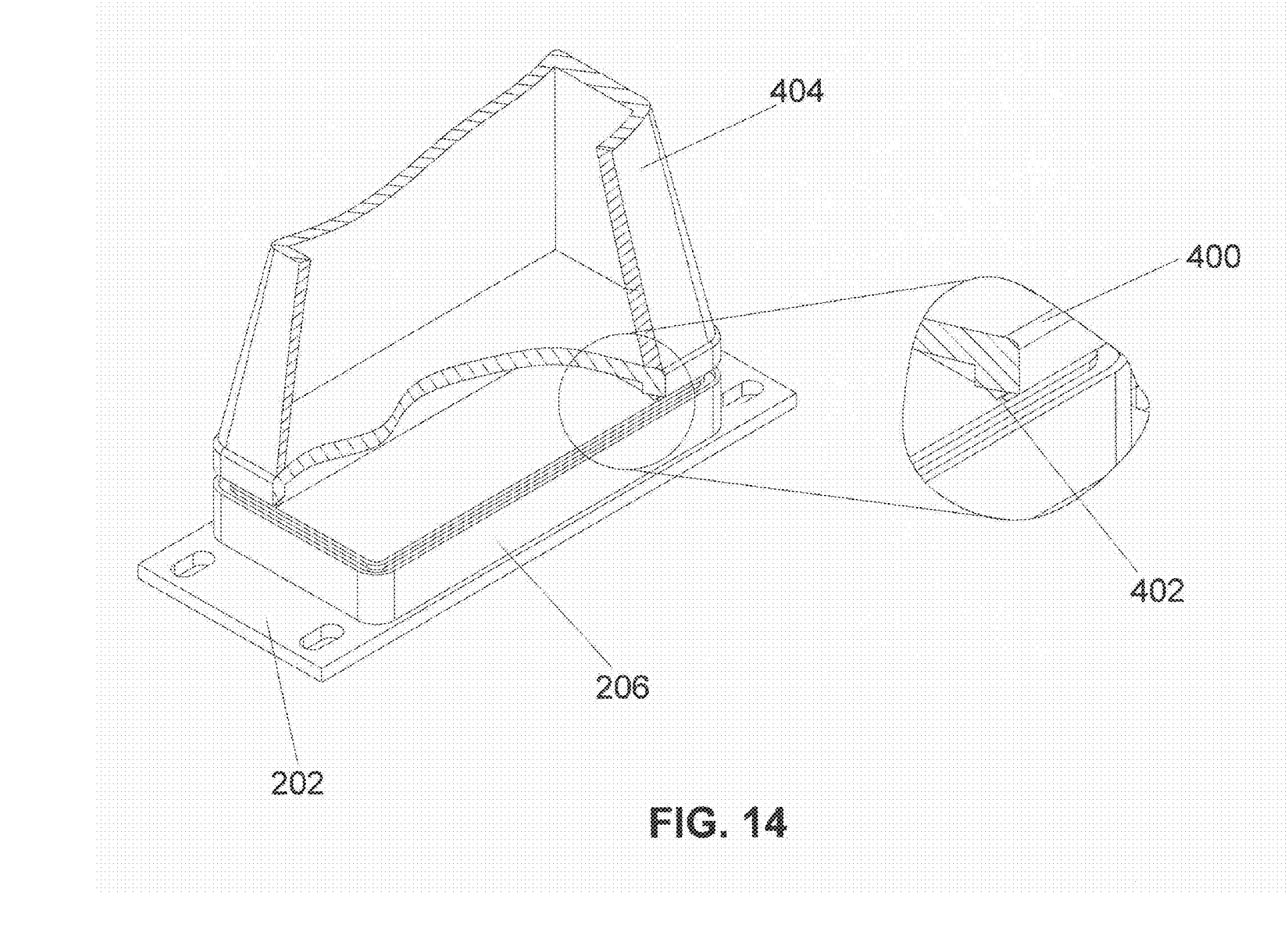
FIG. 14 is a diagrammatic perspective view, with parts broken away, of an ultrasonic horn configured to form hermetic seals in accordance with the invention, along with an enlarged view of an energy director.

The design of an embodiment of an LCP cap 400 in accordance with the invention is shown in FIG. 14. An energy director 402 is provided in LCP cap 400, and an ultrasonic welding horn 404 is configured to operate in conjunction with the shape of the LCP cap 400.

While fundamental and novel features of the invention have been shown and described with respect to preferred embodiments, it will be understood that those skilled in the art may make various changes to the described embodiments based on the teachings of the invention and such changes are intended to be within the scope of the invention as claimed.

What is claimed is:

1. A packaging system for hermetically sealing opto-electronic components while providing a port for exchanging signals with components outside of said system, said packaging system comprising:
    a housing for holding at least one opto-electronic component in place within said housing and including a port for receiving and holding at least one optical fiber cable adapted to optically connect with said opto-electronic component to provide a conduit for exchanging signals with said opto-electronic component, said housing being composed of a material for at least in part hermetically sealing said opto-electronic component within said housing; and
    an optical fiber cable having at least one supplemental layer comprising a liquid crystal polymer material to enhance the strength of said optical fiber cable and promote the formation of a final hermetic seal through said housing port where said supplemental layer of said optical fiber cable interfaces with said housing to complete the hermetic seal of said opto-electronic component within said housing.

2. The packaging system of 1 wherein said housing includes electrical feedthroughs for connecting electrical conductors to said opto-electronic device.

3. The packaging system of claim 1 further including an encasing layer surrounding said supplemental layer to protect it from damage that could otherwise diminish the tensile strength and hermetic seal of said optical fiber cable gained by adding said supplemental layer of said liquid crystal polymer material, said encasing layer comprising a-smooth, non-crystalline thermoplastic.

4. The optical fiber cable of claim 1 wherein said encasing layer is selected from the group comprising polyamides and polyesters.

5. The optical fiber cable of claim 1 wherein said polyamide is Nylon 12.

6. The optical fiber cable of claim 4 wherein said polyamide is chemically removable with a softening agent selected from the group comprising dichloromethane, combined with trifluoroacetic anhydride, benzyl alcohol at 130° C., and HFIP+potassium trifluoroacetate (mass fraction 0.2%). 1,1,1,3,3,3-Hexafluoropropan-2-ol (HFIP).

7. The optical fiber cable of claim 4 wherein said polyesters are chemically removable with a softening agent selected from the group comprising methylene chloride, acetone, methanol, and ethanol.

8. The optical fiber cable of claim 3 wherein said encasing layer can be easily removed with chemicals that do not affect the properties of said supplemental LCP layer so that said supplemental layer can be made accessible to form hermetically sealed interfaces between said optical fiber cable and other structures.

9. The optical fiber cable of claim 1 wherein said liquid crystal polymer material comprises a thermotropic thermoplastic.

10. The packaging system of claim 1 wherein said housing comprises:
    a substrate for fixturing said at least one opto-electronic component;
    a liquid crystal polymer gasket hermetically sealed to said substrate and having formed therein at least one recess adapted to define said port for said optical fiber cable; and
    a liquid crystal polymer cap hermetically sealed to said gasket.

11. The packaging system of claim 10 wherein a liquid crystal polymer gasket is ultrasonically welded to said substrate.

12. The packaging system of claim 10 wherein the liquid crystal polymer cap is ultrasonically welded to said gasket.

13. The packaging system of claim 10 wherein said liquid crystal polymer cap is laser bonded to said substrate.

14. The packaging system of claim 10 wherein said liquid crystal polymer cap is laser bonded to said substrate within the wavelength range from 1.5 to 4.0 microns.

15. The packaging system of claim 10 wherein said substrate is a material selected from the group consisting of liquid crystal polymer, silica, silicon, ceramic, silicon carbide, and metal.

16. The packaging system of claim 10 wherein said gasket further includes electrical feedthroughs for connecting electrical conductors to said opto-electronic device.

17. The packaging system of claim 16 wherein said gasket is injection molded.

18. The packaging system of claim 17 wherein said substrate and said gasket are formed as a single LCP piece by injection molding.

19. The packaging system of claim 1 wherein said opto-electronic component is selected from the group comprising MEMS and OMEMS devices.

* * * * *